United States Patent [19]

Yellin

[11] 4,320,849
[45] Mar. 23, 1982

[54] FOOD SERVING CONTAINER

[76] Inventor: Bernard Yellin, 6 Oak Brook Club Dr., Oak Brook, Ill. 60521

[21] Appl. No.: 191,806

[22] Filed: Sep. 29, 1980

[51] Int. Cl.³ ............................................. B65D 43/14
[52] U.S. Cl. ..................................... 220/252; 220/18; 220/213; 248/134
[58] Field of Search ................. 220/18, 213, 334, 252; 248/127, 128, 134

[56] References Cited

U.S. PATENT DOCUMENTS 931,497  8/1909  Schille .................................. 220/252
1,348,134  7/1920  Barnstead ............................ 248/134
1,970,128  8/1934  Collins .................................. 220/18

Primary Examiner—George T. Hall
Attorney, Agent, or Firm—Arnstein, Gluck & Lehr

[57] ABSTRACT

A food serving container including a base supporting a container bowl and a cover for the bowl. The bowl is supported in fixed position while the cover is pivotally supported so that it may be rocked alternately to open and closed positions. In open position the cover is underposed and when closed the cover is superposed in relation to the bowl.

8 Claims, 11 Drawing Figures

U.S. Patent Mar. 23, 1982 Sheet 2 of 3 4,320,849
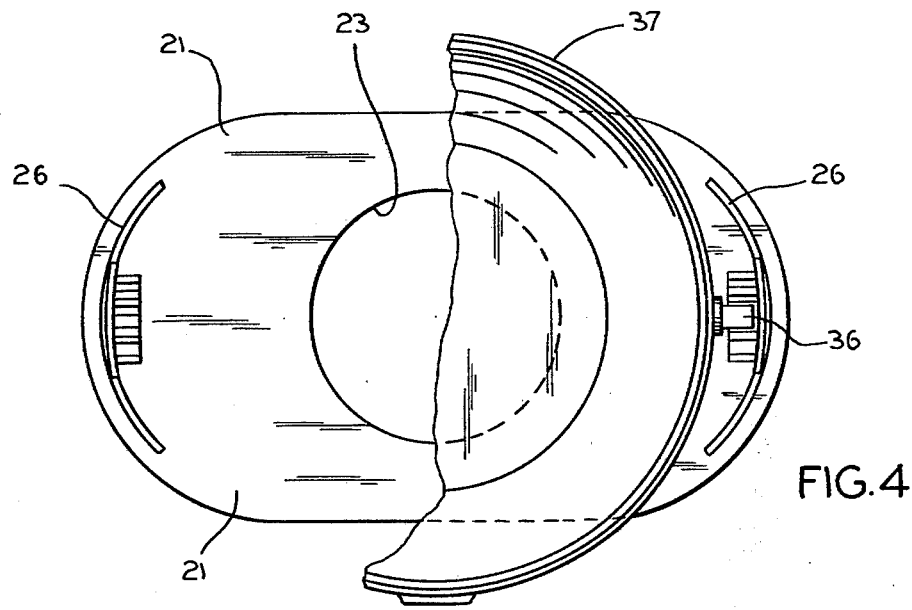
FIG. 4
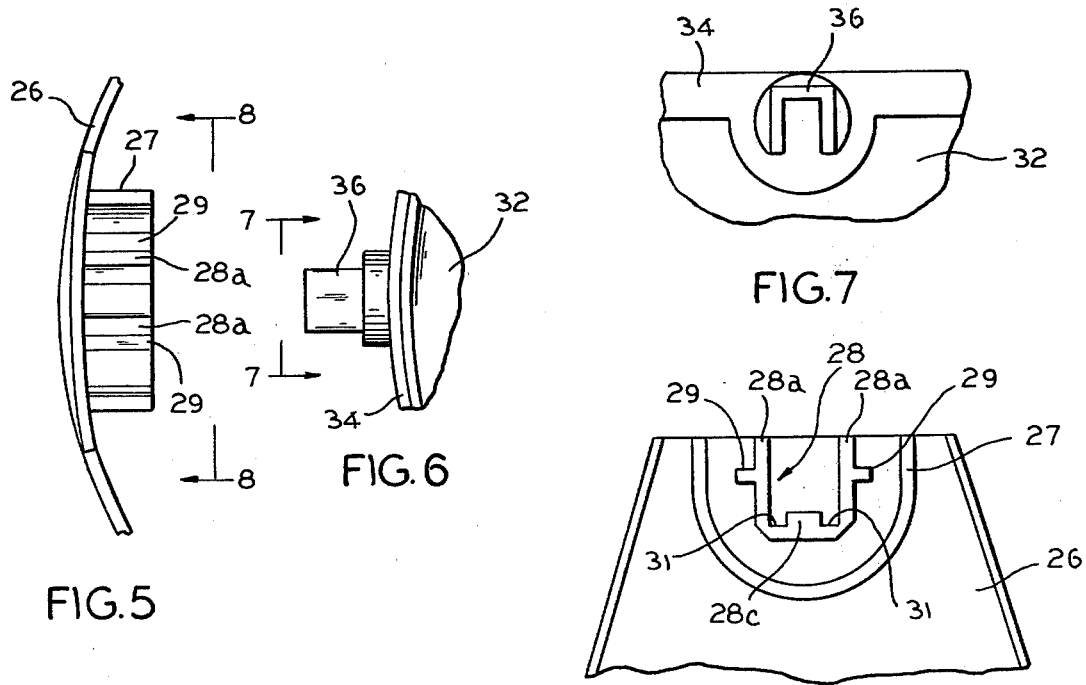
FIG. 5
FIG. 6
FIG. 7
FIG. 8

FOOD SERVING CONTAINER

BACKGROUND OF THE INVENTION

This invention relates to food serving containers intended for outdoor use where food being served may be exposed to possible contamination by reason of flying insects or airborn foreign matter.

One of the objects of this invention is the provision of a food serving container having an easily displaceable cover, preferably transparent, which may be rocked to open position so as to facilitate serving of the food contents and thereafter rocked to closed position to protect the food contents against contamination.

Another object of this invention is the provision of a container of the foregoing type in which the cover is so balanced as normally to tend to rock to fully opened position upon being displaced by just a few degrees from its closed position.

A further object of this invention is the provision of a food serving container of the above type which may be molded from plastic material and which is simple in construction.

Other and further objects and advantages of this invention will become apparent from the following description when considered in connection with the accompanying drawings.

BRIEF DESCRIPTION OF THE DRAWINGS

FIG. 4 is a top plan view with parts broken away to more clearly show structural details.

FIG. 5 is a fragmentary top plan view, on an enlarged scale, of a detail of the base.

FIG. 6 is a similar view of a detail of the container bowl.

FIG. 7 is an end elevational view looking in the direction of the arrows 7—7 of FIG. 6.

FIG. 8 is an end elevational view looking in the direction of the arrows 8—8 of FIG. 5.

BRIEF DESCRIPTION OF A PREFERRED EMBODIMENT

Figure 1:
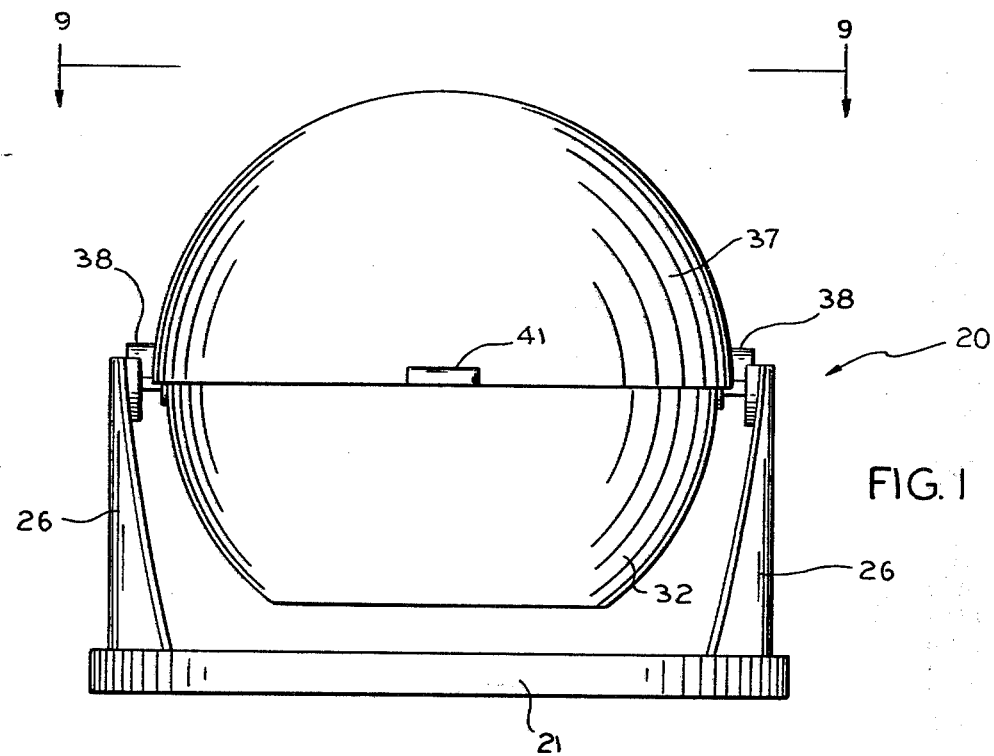
FIG. 1 is a front elevational view of a food serving container in accordance with my invention.

The food serving container 20 of the present invention comprises a base 21 having a generally oval configuration. The base 21 includes a perimetric depending flange 22 and a central aperture 23. The base 21 is provided with a pair of arcuate recesses 24, one at each end, in each of which is secured a standard 26 having a truncated triangular formation and generally arcuate in cross-section. Each standard 26 has on its inner surface, at its upper end, an integral U-shaped flange 27 and disposed inside said flange is a second integral flange 28 shaped substantially like that shown in FIG. 11 and comprised of a pair of parallel side walls 28a and a bottom wall 28b. Each of the side walls 28a has an outwardly projecting lug 29 and the bottom wall 28b has a thickened portion 28c centrally disposed so as to provide a pair of spaced recesses 31. The flanges 27 and 28 of the respective standards 26, 26 are in coaxial registration.

Figures 10, 11:
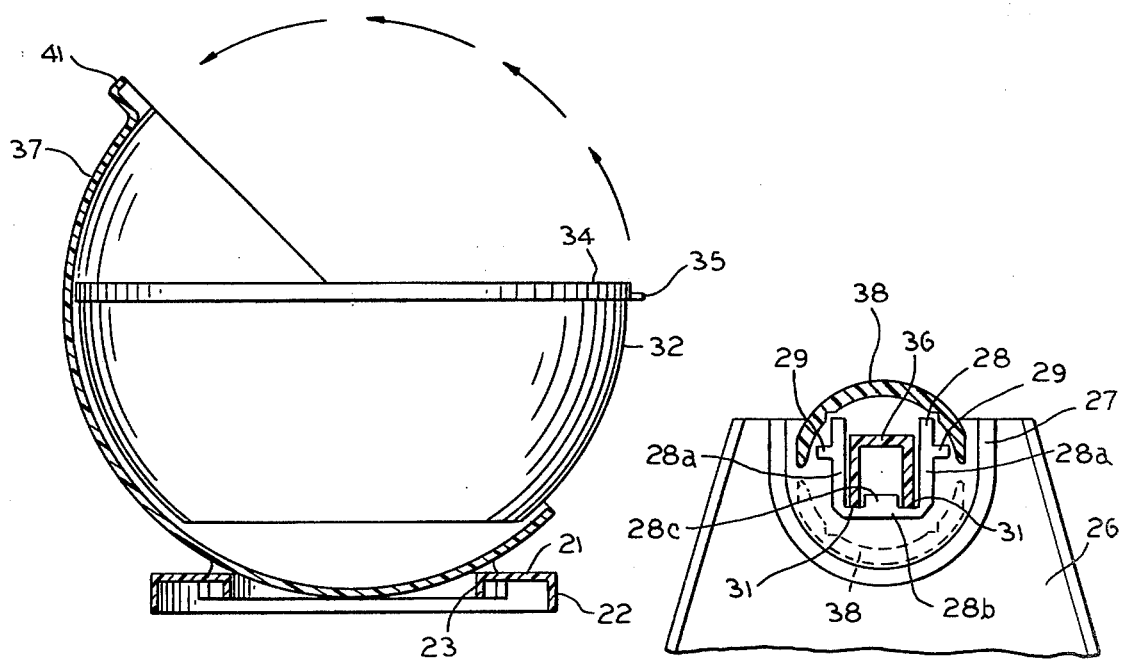
FIG. 10 is a vertical cross sectional view, partly in elevation, with the cover in partly open position.
FIG. 11 is a cross sectional view, on an enlarged scale, taken substantially on line 11—11 of FIG. 9.

A container bowl indicated by the numeral 32 comprises a generally hemispherical body having a flat bottom 33 and a perimetric bead 34 adjacent the mouth of the bowl. Projecting outwardly adjacent the mouth of the bowl 32 are a pair of integral and coaxially aligned support members 36, generally U-shaped, in cross-section substantially as illustrated in FIGS. 7 and 11. The dimensions of the support members 36 are such that each support member fits freely within a recess of a flange 28 with the legs of the support member being received in the lower recesses 31. As will be apparent the bowl 32 is keyed to the base standards 26 so as to be immovable relative thereto. A tab 35 projects outwardly of bead 34.

Figure 3:
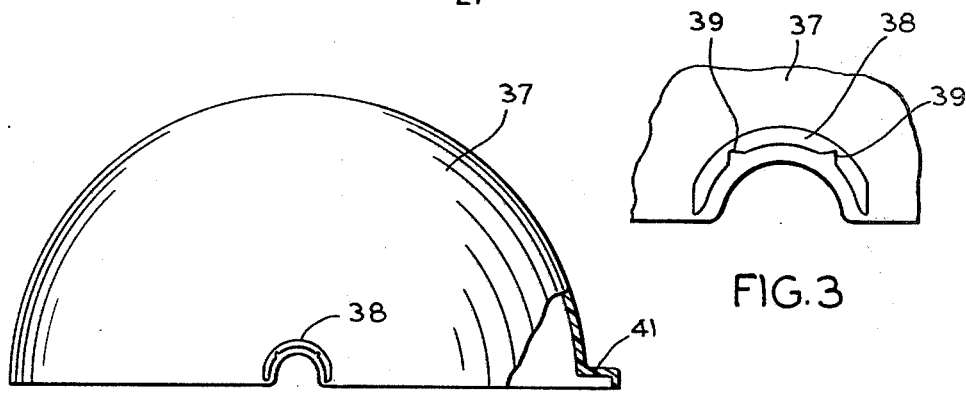
FIG. 3 is a fragmentary end elevational view, on an enlarged scale, of a detail of the cover.
Figure 2:
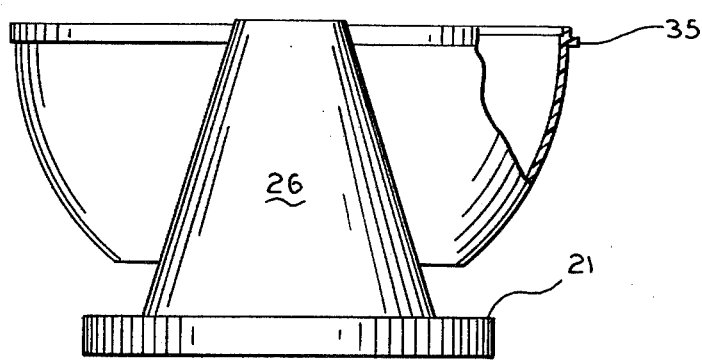
FIG. 2 is a side elevational view, partly in cross section, showing the cover in separated relation.
Figure 9:
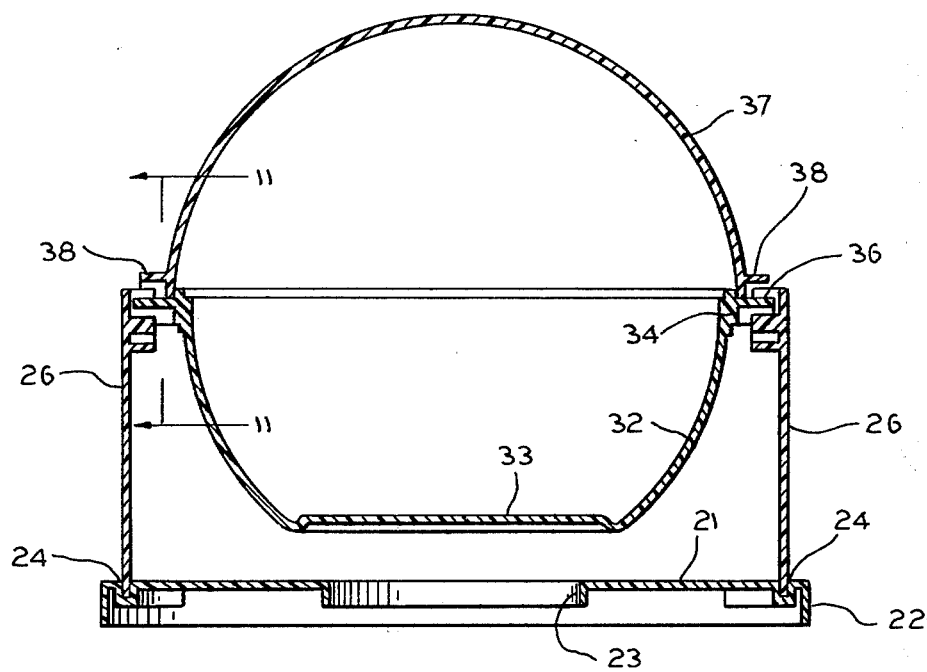
FIG. 9 is a vertical cross sectional view taken substantially on line 9—9 of FIG. 1.

A cover 37 comprises a generally hemispherical body having a radius of curvature which is slightly larger than that of the bowl 32 so as to be concentric with the bowl but spaced therefrom as illustrated in FIG. 10. A pair of generally semi-cylindrical co-axially aligned bearing elements 38 extend outwardly from opposite diametral points adjacent the mouth of the cover. Referring to FIG. 3, it will be seen that the inner surface of each bearing element 38 is provided with two spaced axially extending grooves 39, for a purpose as will be presently explained. As seen particularly in FIGS. 9 and 11, when the cover 37 is in closed position the bearing elements 38 of the cover rest on the tops of side walls 28a with the outer corners of the walls being engaged in respective grooves 39 which serve as detents for maintaining the cover in closed position against inadvertent displacement. It will be apparent that weight of the cover 37 is itself sufficient to hold the cover in closed position until it is manually displaced. A handle member 41 disposed at the mouth of the cover 37 is provided with a recess in which is received the tab 35 on the bead of the bowl. The tab 35 serves as a stop for limiting the movement of the cover 37 relative to the bowl 32 so as to maintain the cover in closed position. As will be apparent by reference to FIGS. 1 and 9 the marginal edge of the mouth of the cover 37 overlaps the bead 34 of the bowl 32 while providing peripheral clearance between the cover 37 and bowl 32 so as to facilitate movement of the cover relative to the bowl.

In order to move the cover 37 to open position, the handle member 41 is grasped and the cover is rocked in the direction of the arrows, as illustrated in FIG. 10. As seen in FIG. 11 as the bearing elements 38 of the cover 37 move off of the upper surfaces of the flange walls 28a the weight of the cover is transferred to the flanges 27 so that the bearing elements 38 now engage the inner surfaces of the flanges 27, as shown by the broken lines in FIG. 11. In the transitional movement between opened and closed positions and in fully opened position the lugs 29 serve to guide and maintain the cover 37 in substantially concentric alignment with the bowl 32 so that clearance between the cover and bowl is assured. In fully opened position the diametrical edge of the cover 37 is abutted against the tab 35 which serves as a stop to limit the movement of the cover. As will be seen in FIG. 10, the central recess 23 provides clearance for accommodating the cover 37 as it is moved relative to the bowl 32. In closed position the contents of the bowl are fully protected against contamination by extraneous foreign matter. As will be apparent the parts may be readily disassembled for purposes of cleaning. Advantageously, all of the parts may be molded from plastic materials.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A food serving container comprising a base having a pair of spaced upright standards, each of said standards having a first substantially U-shaped flange and a second substantially U-shaped flange, both of said flanges being inwardly directed with the second flange being disposed within said first flange and defining a space therebetween, a container bowl having a pair of diametrically spaced outwardly directed projections each received between the legs of a respective second U-shaped flange and supported on said standards, a cover having a pair of diametrically spaced outwardly directed arcuate flanges, the arcuate flanges of the cover being rested on the legs of respective second U-shaped flanges when the cover is superposed on said bowl and providing a closure for the bowl, said cover being rockable to underpose said cover in relation to said bowl thereby to open said bowl for removal of contents from the bowl, said arcuate flanges when the cover is in underposed position being rested on said first U-shaped flanges.

2. The invention as defined in claim 1 in which the arcuate flanges move in the spaces between said first and second flanges as the cover is rocked from closed to open position and from open to closed position.

3. The invention as defined in claim 1 including a pair of detents on each of said arcuate flanges, the legs of said second flanges being engaged in said detents when the cover is superposed on said bowl.

4. The invention as defined in claim 1 in which the bowl and cover are generally hemispherical and have a radius of curvature greater than that of the bowl so that in underposed position to the bowl the cover is disposed substantially concentric with the bowl.

5. The invention as defined in claim 1 including cooperating stop means on the bowl and cover for limiting the movement of the cover relative to the bowl.

6. the invention as defined in claim 1 in which the parts are formed of molded plastic material.

7. The invention as defined in claim 1 in which the bowl is fixed in relation to the base.

8. A food serving container comprising a base having a pair of spaced upright standards, a generally hemispherical container bowl supported on said standards, a generally hemispherical cover supported on said standards for pivotal movement about a transverse axis relative to said bowl, the cover having a radius of curvature greater than that of the bowl so that it may be disposed in a position substantially concentric with the bowl, said cover being adapted for positioning in superposed relation to said bowl to provide a closure therefor, said cover being rockable to underpose the cover in relation to the bowl so as to permit removal of contents from the bowl.

* * * * *

Disclaimer 4,320,849.—*Bernard Yellin*, Oak Brook, Ill. FOOD SERVING CONTAINER. Patent dated Mar. 23, 1982. Disclaimer filed May 5, 1982, by the inventor.

Hereby enters this disclaimer to claim 8 of said patent.

[*Official Gazette August 10, 1982.*]